(12) United States Patent
Park et al.

(10) Patent No.: US 8,738,697 B2
(45) Date of Patent: May 27, 2014

(54) HIGHLIGHT PROVIDING SYSTEM AND METHOD BASED ON HOT TOPIC EVENT DETECTION

(75) Inventors: Ho Gun Park, Seoul (KR); Hee Dong Ko, Seoul (KR); Sun Bum Youn, Incheon (KR)

(73) Assignee: Korea Institute of Science and Technology, Seoul (KR)

( * ) Notice: Subject to any disclaimer, the term of this patent is extended or adjusted under 35 U.S.C. 154(b) by 166 days.

(21) Appl. No.: 13/014,987

(22) Filed: Jan. 27, 2011

(65) Prior Publication Data

US 2012/0079020 A1   Mar. 29, 2012

(30) Foreign Application Priority Data

Sep. 27, 2010   (KR) .................. 10-2010-0093188

(51) Int. Cl.
*G06F 15/16*   (2006.01)
(52) U.S. Cl.
USPC ......................................... 709/204; 715/751
(58) Field of Classification Search
None
See application file for complete search history.

(56) References Cited

U.S. PATENT DOCUMENTS

| | | | | |
|---|---|---|---|---|
| 5,610,999 | A * | 3/1997 | Bannai et al. | 382/272 |
| 7,836,061 | B1 * | 11/2010 | Zorky | 707/749 |
| 2003/0185378 | A1 * | 10/2003 | Mullen | 379/265.01 |
| 2008/0010605 | A1 * | 1/2008 | Frank | 715/765 |
| 2011/0041080 | A1 * | 2/2011 | Fleischman et al. | 715/751 |
| 2012/0136676 | A1 * | 5/2012 | Goodall et al. | 705/2 |

FOREIGN PATENT DOCUMENTS

| | | | | |
|---|---|---|---|---|
| JP | 2004-233541 | A | | 8/2004 |
| JP | 2004233541 | A | * | 8/2004 ............. G10L 15/08 |
| KR | 10-2008-0058356 | A | | 6/2008 |
| KR | 10-2009-0019582 | A | | 2/2009 |
| KR | 10-0962923 | B1 | | 6/2010 |

OTHER PUBLICATIONS

"Earthquake Shake Twitter Users: Real-time Event Detection by Social Sensor", published Apr. 26-30, 2010, pp. 851-860.*

* cited by examiner

*Primary Examiner* — Nirav B Patel
*Assistant Examiner* — Mohammed Waliullah
(74) *Attorney, Agent, or Firm* — Fenwick & West LLP

(57) ABSTRACT

Provided are a system capable of providing a highlight of a real-time event using message streams of social media and a highlight service providing method using the same. The disclosed highlight providing system includes: a hot event session detection unit detecting a hot event session where a hot event occurs using message streams of social media; a keyword detection unit detecting keywords related with the hot event from the hot event session detected by the hot event session detection unit using a predetermined algorithm; a hot event generating unit generating the hot event using a semantic relation between the keywords detected by the keyword detection unit; and a highlight providing unit providing a highlight of the social media along with a description in a natural language based on the hot event generated by the hot event generating unit.

14 Claims, 6 Drawing Sheets

HIGHLIGHT PROVIDING SYSTEM AND METHOD BASED ON HOT TOPIC EVENT DETECTION

CROSS-REFERENCE TO RELATED APPLICATION

This application claims priority to Korean Patent Application No. 10-2010-0093188, filed on Sep. 27, 2010, and all the benefits accruing therefrom under 35 U.S.C. §119, the contents of which in its entirety are herein incorporated by reference.

BACKGROUND

1. Field

The present disclosure relates to a highlight providing system for a real-time event using messages of social media and a highlight service providing method using the same.

2. Description of the Related Art

Recently, social media such as Internet-based instant chatting services and microblogging are becoming popularized. Through various social media, users share information about news or real-time events such as sports games and exchange their opinions. Twitter is a typical example of the microblogging services. And, Ustream and Afreeca are typical examples of the instant chatting-based video sharing services.

A user who uses social media may miss important information about a real-time event while he/she leaves for a while. And, even if the user keeps on using the social media, he/she cannot get information about real-time events occurring in the channels other than the channel he/she is using. For example, a user who is watching a baseball game using an instant chatting-based video sharing service may miss important scenes while he/she goes to the bathroom, and cannot get information about important scenes occurring in other baseball parks.

Although the existing instant chatting-based video sharing services provide highlights of a sports game, they are available only after the game ends. Further, the highlights have to be manually edited by a service provider.

SUMMARY

The present disclosure is directed to providing a system automatically providing highlight for a real-time event by extracting a hot topic event from message streams of social media and a highlight service providing method using the same.

In one aspect, there is provided a highlight providing system for a real-time event including: a hot event session detection unit detecting a hot event session where a hot event occurs using message streams of social media; a keyword detection unit detecting keywords related with the hot event from the hot event session detected by the hot event session detection unit using a predetermined algorithm; a hot event generating unit generating the hot event using a semantic relation between the keywords detected by the keyword detection unit; and a highlight providing unit providing a highlight of the social media along with a description in a natural language based on the hot event generated by the hot event generating unit.

In an embodiment, the highlight providing system may further include a noise filtering unit filtering messages satisfying a preset noise condition from the message streams of the social media and providing the noise-removed message streams to the hot event session detection unit.

The preset condition may be that the messages are noise messages previously stored in a database or that the frequency of occurrence of the messages is above a preset threshold value.

From among the sections of the message streams where the number of messages occurring is larger than a value determined based on an average number of the messages that occurred, the hot event session detection unit may detect a section around a point where the gradient of the number of messages occurring in a given time changes signs as the hot event session.

Here, the section around the point may be the section where the absolute value of the gradient is larger than a preset threshold value.

The keyword detection unit may detect the keywords related with the hot event by analyzing a binomial distribution of the messages in the hot event session detected by the hot event session detection unit.

The semantic relation may be one of an action relation, a sequence relation and a context relation.

The highlight providing unit may further provide video information of the social media corresponding to the time when the hot event has occurred.

The highlight providing unit may further provide a previous hot event similar to the hot event generated by the hot event generating unit along with a description in a natural language.

The highlight providing unit may further provide video information of the social media corresponding to the time when the previous hot event similar to the hot event generated by the hot event generating unit has occurred.

In another aspect, there is provided a highlight service providing method for a real-time event including: receiving message streams of social media; detecting a hot event session where a hot event occurs using the received message streams; detecting keywords related with the hot event from the detected hot event session using a predetermined algorithm; generating the hot event using a semantic relation between the detected keywords; and providing a highlight of the social media along with a description in a natural language based on the generated hot event.

In an embodiment, the highlight service providing method may further include filtering messages satisfying a preset noise condition from the received message streams of the social media, and the preset condition may be that the messages are noise messages previously stored in a database or that the frequency of occurrence of the messages is above a preset threshold value.

The detection of the hot event session where a hot event occurs using the received message streams may include detecting, from among the sections of the message streams where the number of messages occurring is larger than a value determined based on an average number of the messages that occurred, a section around a point where the gradient of the number of messages occurring in a given time changes signs as the hot event session.

Here, the section around the point may be the section where the absolute value of the gradient is larger than a preset threshold value.

The detection of the keywords related with the hot event from the detected hot event session using the predetermined algorithm may include detecting the keywords related with the hot event by analyzing a binomial distribution of the messages in the detected hot event session.

The semantic relation may be one of an action relation, a sequence relation and a context relation.

In an embodiment, the highlight service providing method may further include providing video information of the social media corresponding to the time when the hot event has occurred.

In an embodiment, the highlight service providing method may further include providing a previous hot event similar to the hot event generated by the hot event generating unit along with a description in a natural language.

In an embodiment, the highlight service providing method may further include providing video information of the social media corresponding to the time when the previous hot event similar to the hot event generated by the hot event generating unit has occurred.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
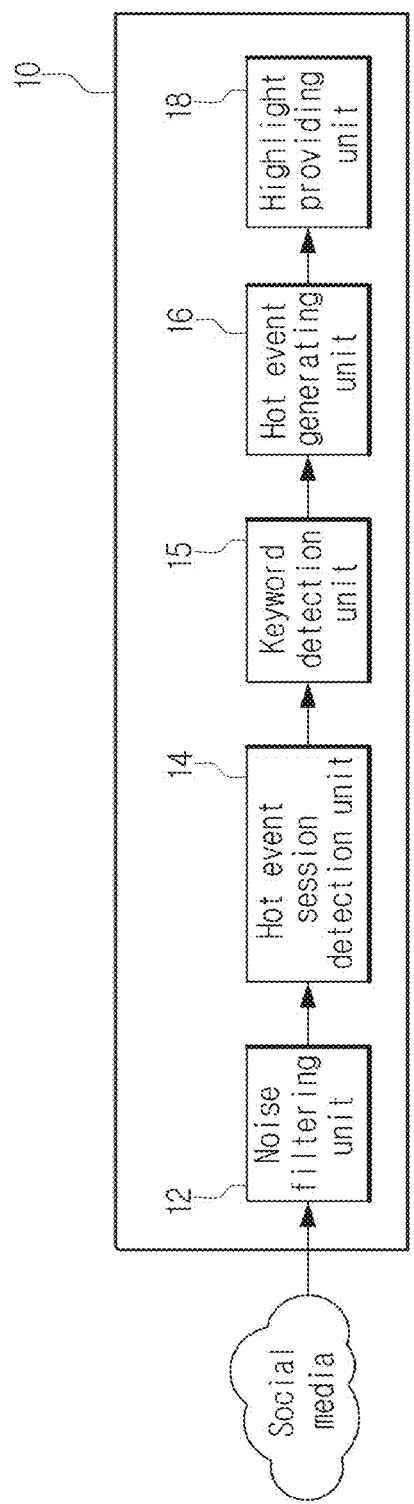
FIG. 1 schematically illustrates a configuration of a highlight providing system for a real-time event according to an embodiment of the present disclosure.

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals denote like elements. The shape, size and regions, and the like, of the drawing may be exaggerated for clarity.

A highlight providing system and a highlight service providing method for a real-time event according to the present disclosure are based on the fact that message streams of social media may be an important source for detecting instant hot events. As used herein, 'hot events' refer to the situations to which the users of the social media pay their attentions. If a user is watching a baseball game an instant chatting-based video sharing service, such important situations as 'hit' or 'home run' are 'hot events'. When a hot event occurs, the number of messages occurring in the social media increases instantly. The messages include keywords that can describe the hot event. The present disclosure provides a highlight providing system and a highlight service providing method for a real-time event based thereon. For convenience's sake, description will be given for a situation where a user is watching a baseball game using an instant chatting-based video sharing service of social media. The instant chatting function can be replaced with external social media services such as Twitter.com or Facebook.com FIG. 1 schematically illustrates a configuration of a highlight providing system for a real-time event according to an embodiment of the present disclosure.

A highlight providing system 10 for a real-time event according to an embodiment of the present disclosure comprises a noise filtering unit 12, a hot event session detection unit 14, a keyword detection unit 15, a hot event generating unit 16 and a highlight providing unit 18.

The noise filtering unit 12 filters noise messages from the message streams of the social media and provides the noise-removed message streams to the hot event session detection unit 14. That is to say, since the message streams occurring in the social media include a lot of noise messages irrelevant to a hot event, they are removed to improve efficiency of the highlight providing system 10 for a real-time event.

That is to say, the noise filtering unit 12 may filter the messages satisfying a preset noise condition from the message streams of the social media and provide the noise-removed message streams to the hot event session detection unit 14. Here, the preset condition may be that the messages are noise messages previously stored in a database or that the frequency of occurrence of the messages is above a preset threshold value. It is because the noise messages that can be expected considering the characteristics of the social media can be stored in the database and the messages occurring too frequently are likely to be meaningless data. An exemplary noise type classification is shown in Table 1.

TABLE 1

| Noise types | Contents |
| --- | --- |
| Expectation | Expectation for a likely event |
| Cheering | Cheering for a player or a team |
| Others | Meaningless messages, excessively repeated words, etc. |

Referring to Table 1, 'expectation', 'cheering' and 'others' are given as noise message types. The 'expectation' refers to expression of a user's expectation for a likely event in a baseball game. A message such as 'The Kia Tigers will score in this inning!' is an example. The 'cheering' refers to expression of a user's cheering for a particular player or team. A message such as 'Lee Dae-Ho has to hit a home run.' is an example. The 'others' include other meaningless messages, excessively repeated particular words, expressions too short to understand, or the like. Of course, the noise message types described in Table 1 are only exemplary and there may be many other noise types.

A support vector machine (SVM) classifier may be used to filter the noise messages. When the SVM classifier is employed, of the positive set data and the negative set data acquired by training, only the positive message set may be allowed to be used to detect a hot event.

The noise filtering unit 12 may be omitted depending on system designs.

The hot event session detection unit 14 receives the noise-removed message streams from the noise filtering unit 12 and detects a hot event session where a hot event occurs using. The hot event session detection unit 14 may detect, from among the sections of the message streams where the number of messages occurring is larger than a value determined based on an average number of the messages that occurred, a section around a point where the gradient of the number of messages occurring in a given time changes signs as the hot event session. A detailed operation of the hot event session detection unit 14 will be described in detail later referring to FIG. 3.

The keyword detection unit 15 detects keywords related with the hot event from the hot event session detected by the hot event session detection unit 14 using a predetermined algorithm. The keyword detection unit 15 may detect the keywords related with the hot event by analyzing a binomial distribution of the messages in the hot event session detected by the hot event session detection unit 14. Let $N_w$ be the number of keywords in one hot event session window w, and let $n_{fw}$ be the number of frequency f occurring in the hot event session window w. Then, the following equations are derived.

$$p_b(w, f; p_e) = \sum_{k=1}^{n_{fw}} p(k; N_w, p_e) \quad (1)$$

$$p(k; N_w; p_e) = \binom{N_w}{k} p_e^k (1 - p_e)^{N_w - k} \quad (2)$$

$$p_e = \frac{1}{L} \sum_{w \in W} \left( \frac{n_{fw}}{N_w} \right) \quad (3)$$

As seen from Equation (1), $p_b(w, f; p_e)$ can be calculated using the cumulative distribution function of the binomial distribution. The probability mass function $p(k; N_w; p_e)$ is calculated by Equation (2), and the expected probability $p_e$ is calculated by Equation (3). The expected probability is the average of the frequency of messages in the total hot event session windows. L represents the number of the total hot event session windows. The cumulative distribution function $p_b(w, f; p_e)$ is used to determine whether the probability exhibits the bursty feature of the hot event session. If the value is larger than the threshold value, the distribution may be regarded as unusual.

The hot event generating unit 16 generates the hot event using a semantic relation between the keywords detected by the keyword detection unit 15. The semantic relation may be one of an action relation (do-action), a sequence relation (next-event-of) and a context relation (contextually-related-to). The semantic relation will be described in detail referring to Table 2.

TABLE 2

| Semantic relation | Detected keywords | Hot event |
| --- | --- | --- |
| Action relation | Keyword A (entity type: action) Keyword B (entity type: player, team) | <Keyword B> does <Keyword A>. |
| Sequence relation | Keyword A (entity type: action) Keyword B (entity type: action) | If Keyword A occurs earlier, <Keyword B> occurs after <Keyword A>. |
| Context relation | Keyword A Keyword B | An event is generated based on the context relation of <Keyword A> and <Keyword B> after searching the database. |

Referring to Table 2, the 'action relation' may be the case where the combination of keyword entity types is an action and a player or team. That is to say, if the entity type of Keyword A is action and the entity type of Keyword B is player or team, the hot event '<Keyword B> does <Keyword A>' is generated.

The 'sequence relation' may be the case where the entity types of both keywords are action. That is, if the entity types of both Keyword A and Keyword B are action and Keyword A occurs earlier that Keyword B (it is determined using the timestamp), the hot event '<Keyword B> occurs after <Keyword A>' is generated.

The 'context relation' may be the case where the entity types of the keywords do not belong any of the above two cases. In this case, an event is generated based on the context relation of <Keyword A> and <Keyword B> after searching the database. A detailed example will be described in detail later referring to Table 3 and Table 4.

The highlight providing unit 18 provides a highlight of the social media along with a description in a natural language based on the hot event generated by the hot event generating unit 16. The highlight providing unit 18 may also provide video information of the social media corresponding to the time when the hot event has occurred.

Figure 2:
FIG. 2 shows a screen of a highlight providing system for a real-time event according to an embodiment of the present disclosure.
Figure 3:
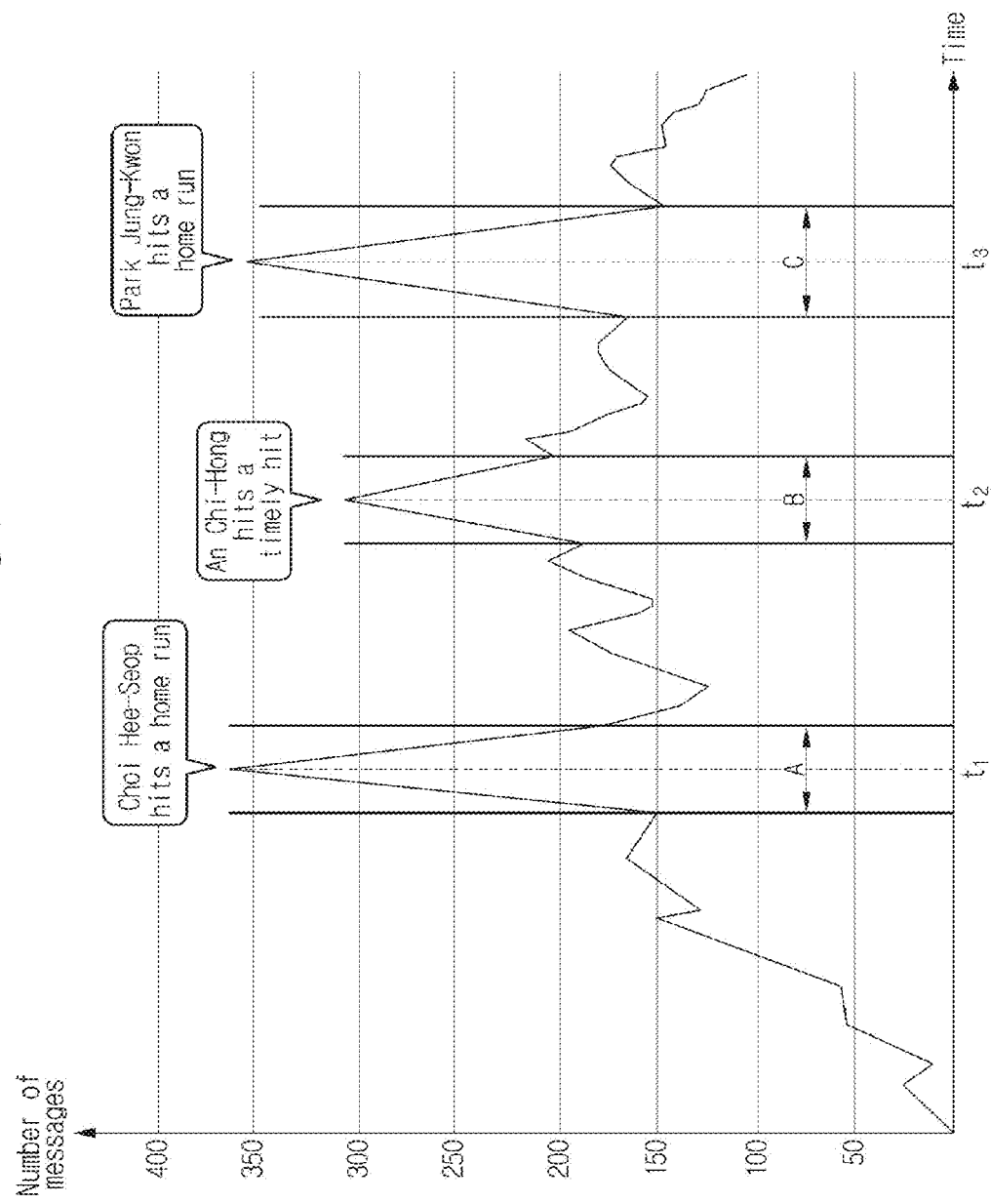
FIG. 3 is a graph illustrating how a hot event session detection unit of a highlight providing system for a real-time event according to an embodiment of the present disclosure detects a hot event session.

FIG. 2 shows a screen of a highlight providing system for a real-time event according to an embodiment of the present disclosure, and FIG. 3 is a graph illustrating how a hot event session detection unit of a highlight providing system for a real-time event according to an embodiment of the present disclosure detects a hot event session.

Referring to FIG. 2, the highlight providing system 10 for a real-time event according to an embodiment of the present disclosure is providing video information of a baseball game on the left side and is providing an instant chatting service on the right side. The video information on the left side shows a tense situation where a runner reaches the home plate on a hit. The chatting window on the right side shows messages of the social media users about the current hot event. As described earlier, the highlight providing system 10 for a real-time event according to the present disclosure is able to provide a highlight by generating the hot event using the message streams of the social media. The operation of the hot event session detection unit 14 will be described referring to FIG. 3.

The graph in FIG. 3 shows the number of messages occurring in the social media in a given time. As seen from FIG. 3, the number of messages increases instantly when a hot event such as 'Choi Hee-Seop hits a home run', 'An Chi-Hong hits a timely hit' or 'Park Jung-Kwon hits a home run' occurs. A hot event session window w may be set around the peak position of the number of messages. As used herein, the 'hot event session window' refers to a time section where a hot event occurs. The keywords are extracted from the hot event session and then the hot event is generated based on the semantic relation thereof.

The following algorithm may be used to detect the hot event session.

<Algorithm>
Algorithm: Hot Event Session Detection

Let C be history
  Let $\mu \leftarrow \mu(C)$ // the average of C
  Let $\sigma \leftarrow \sigma(C)$ // the standard deviation of C
  $k \leftarrow 0$
  repeat
    $k \leftarrow k + 1$
    $E_k \leftarrow \emptyset$
    find the highest count $c_k$ in a given C
    $s_l$ = left end of the spike having a peak$c_k$
    $s_r$ = right end of the spike having a peak$c_k$
      for each $s_l < c_j < s_r$ do
        $C \leftarrow C - \{ c_j \}$
        $E_k \leftarrow E_k, c_j$
      end for
  until c $> \mu + 2\sigma$
  return $\{ E_l, ..., E_k \}$ This algorithm is used to detect the peak position of messages. More specifically, the average and gradient of the number of the messages that occurred are used. In the above algorithm, C is a set of messages, with the elements of each C being the number of social media streams generated per minute. $\mu( )$ and $\sigma( )$ are functions calling average and standard deviation, respectively. To find the peak position, the global maximum should be found in the set C.

As seen from FIG. 3, each maximum corresponds to the position where the slope, i.e. gradient, changes signs from positive to negative. However, there are numerous such peaks, it is necessary to detect the positions where more than a preset number of messages occur in a unit time in order to detect reliable keywords. The $\mu( )$ and $\sigma( )$ may be set variously depending on the design specification.

In FIG. 3, at our sample experiment, the $\mu( )$ value is set as 250 or more messages. There are three peaks with 250 or more messages and with the gradient changing signs, at times $t_1$, $t_2$ and $t_3$. Then, the hot event sessions are to be set around these points. Although the hot event session may be set as a predetermined time interval before and after the peak point, this may result in poor data reliability. Thus, the following scheme may be employed.

Specifically, since the number of messages increases instantly when a hot event occurs, the section where the absolute value of the gradient is larger than a preset threshold value may be set as the hot event session. Referring to FIG. 3, hot event sessions A, B and C are detected in this way. Once the hot event sessions are detected, keywords may be detected and the hot events may be generated automatically using the semantic relation of the keywords, as described earlier.

A test example based on an actual baseball game will be described referring to Table 3 and Table 4.

TABLE 3

| Event | # of messages | # of hotevent sessions having bursty features | # of bursty features | # of actions | # of players/ teams | # of relations |
|---|---|---|---|---|---|---|
| S vs K(C) (Oct. 23, 2009) | 24980 | 29 | 88 | 11 | 44 | 158 |
| S vs K(C) (Oct. 19, 2009) | 14571 | 25 | 45 | 6 | 18 | 117 |
| L vs H(T) (Jun. 10, 2010) | 501 | 4 | 5 | 0 | 2 | 48 |
| D vsK(T) (Jun. 10, 2010) | 324 | 2 | 2 | 1 | 1 | 23 |
| L vs S(T) (Jun. 06, 2010) | 1033 | 13 | 16 | 3 | 8 | 165 |
| L vs H(T) (Jun. 08, 2010) | 903 | 9 | 12 | 0 | 6 | 126 |
| L vs D(T) (Jun. 09, 2010) | 766 | 7 | 13 | 1 | 5 | 137 |
| L vs K(T) (Jun. 11, 2010) | 641 | 9 | 14 | 1 | 8 | 140 |
| D vsK(T) (Jun. 08, 2010) | 683 | 5 | 7 | 0 | 3 | 121 |

TABLE 4

| The beginning of Hot event session (# of total features) | Bursty Feature | Relation |
|---|---|---|
| 21:31:05(5,247) | Choi Hee-Seop(Player), (Amazing), Chae Byung-Ryong(Player) | |
| 18:42:17(7,213) | Jung Sang-Ho(Player) | Juno Sang-Ho (Player)-Contextually-Related-To- (Hit, Action) |
| 20:42:52(5,206) | (Double Play, Action), Chae Byung-Ryong(Player), (Cheer up) | Cha Il-Mok (Player) - do-actions - (Double Play, Action) (Cheer up)-Contextually-Related-To-SK(Team) |
| 21:21:04(4,196) | Lee Jae-Joo(Player), Heo Kyung(Player), Na Ji-Wan(Player), Ko Hyo-Joon(Player) | Ko Hyo-Joon(Player)-Contextually-Related-To- (The first pitch) Ko Hyo-Joon(Player)-Contextually-Related-To- (Pictcher) |
| 19:21:29(5,175) | (Lucky), Kim Sang-Hyeon(Player), (Homerun, Action), (Foul | Kim Sang-Hyeon(Player)-Contextually-Related-To- (The first pitch) Kim Sang-Hyeon(Player)-Contextually-Related-To- Choi Hee-Seop(Player) |

TABLE 4-continued

| The beginning of Hot event session (# of total features) | Bursty Feature | Relation |
|---|---|---|
| | ball, Action), (judge) | Kim Sang-Hyeon(Player)-Contextually-Related-To- KIA (Team) |
| | | Kim Sang-Hyeon(Player)-Contextually-Related-To- Lee Jong-Beom(Player) |
| | | (judge)-Contextually-Related-To- (Video) |
| | | (judge)-Contextually-Related-To- (Homerun, Action) |
| | | (Foul ball, Action)-next-event-of- (Homerun, Action) |
| 21:11:00(5,168) | (Face), (Fielding, Action) | (Fielding, Action)-Contextually-Related-To-Cho Dong-Hwa(Player) |
| 21:28:05(5,164) | Choi Hee-Seop(Player), (Full-base), | Choi Hee-Seop(Player)-do-action- (Homerun, Action) |
| | (Homerun, Action), (Go) | Choi Hee-Seop(Player)-Contextually-Related-To- (Homerun, Action) |
| | | Choi Hee-Seop(player)-Contextually-Related-To- (Full base) |

In Table 3, 'L' stands for the LG Twins, 'K' for the Kia Tigers, 'D' for the Doosan Bears, 'S' for the SK Wyverns, and 'H' for the Hanwha Eagles. In Table 3, the number of total messages for particular teams on each date, the number of hot event sessions having bursty features, the number of bursty features (i.e., the number of keywords), the number of actions, the number of players/teams and the number of relations are shown.

In Table 4, major hot event sessions detected during a game between the SK Wyverns and the Kia Tigers on Oct. 23, 2009. Referring to Table 4, the times at which the hot event sessions began, the bursty features (i.e., keywords), and the semantic relations are shown. For example, at 20:42:52, the keywords 'Double play', 'Cha II-Mok' and 'Cheer up' were detected, and, based on the action relation, the hot event 'Cha II-Mok hits into a double play.' was detected. Very reliable results were attained for the action relation and the sequence relation. In case of the semantic relation, the relevant hot event may be provided once the corresponding database is constructed.

Now, an exemplary operation of the highlight providing system 10 for a real-time event according to the present disclosure will be described referring to FIG. 4 and FIG. 5.

Figure 4:
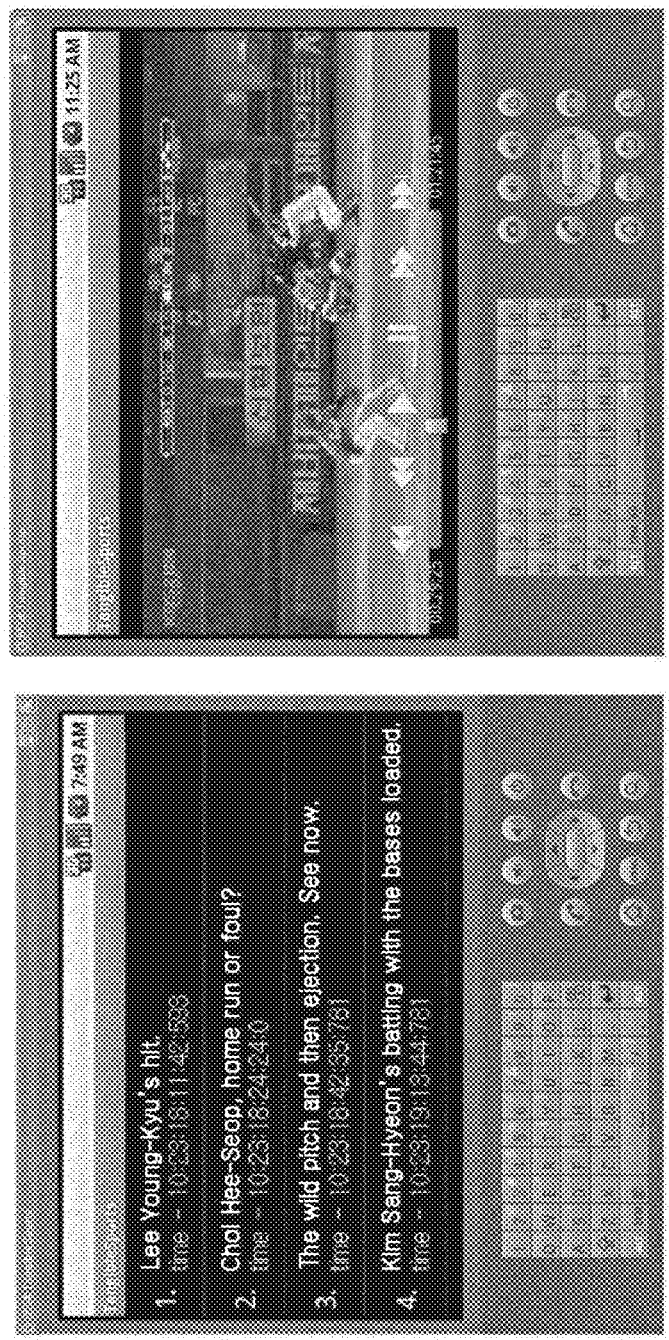
FIG. 4 shows a highlight screen of a highlight providing system for a real-time event according to an embodiment of the present disclosure.
Figure 5:
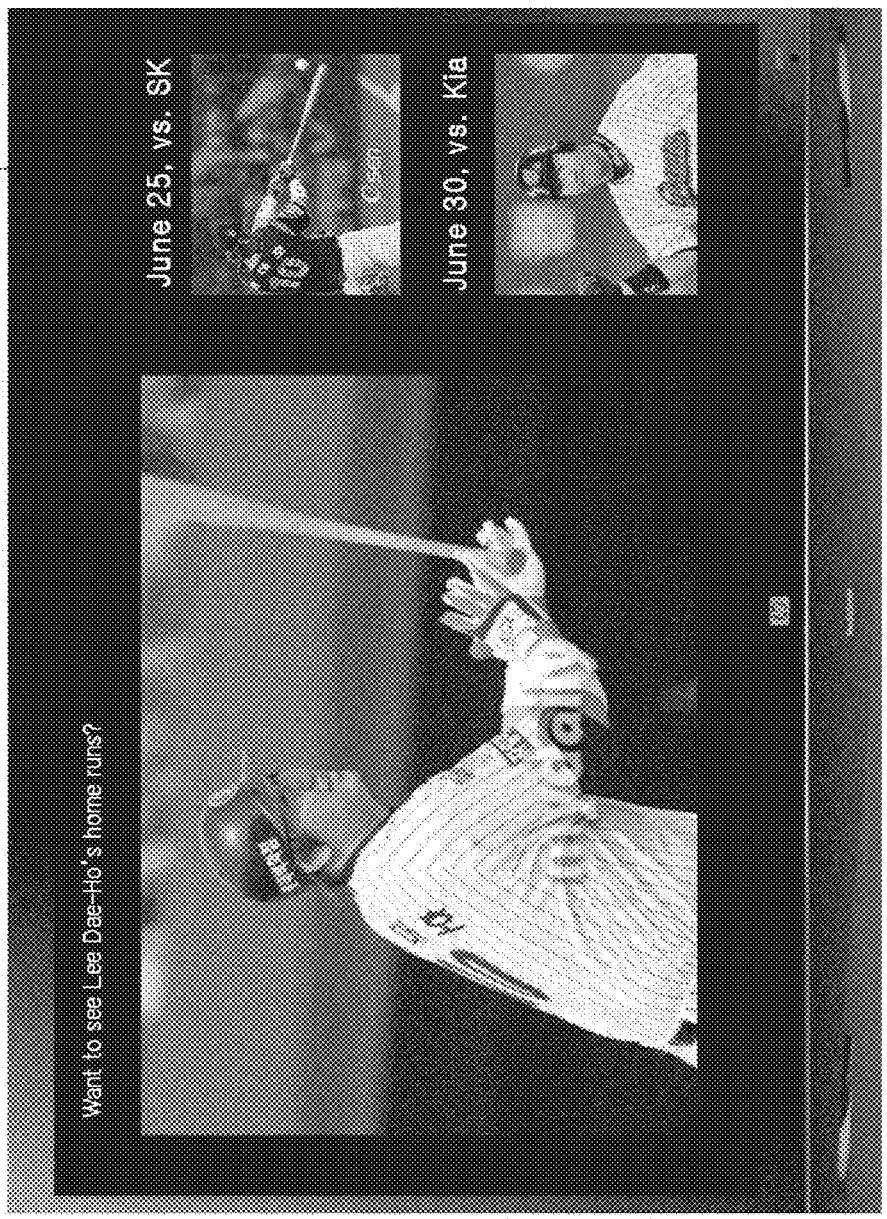
FIG. 5 shows a flashback screen of a highlight providing system for a real-time event according to an embodiment of the present disclosure.

FIG. 4 shows a highlight screen of a highlight providing system for a real-time event according to an embodiment of the present disclosure, and FIG. 5 shows a flashback screen of a highlight providing system for a real-time event according to an embodiment of the present disclosure.

Referring to FIG. 4, detected hot event information is provided along with a description in a natural language on the left-side interface of the highlight providing system 10 for a real-time event according to an embodiment of the present disclosure. In response to a user's selection of the desired hot event information, the video information corresponding to the hot event information is being played back on the right-side interface. Since the detected hot event information includes the timestamp of the hot event, the video information corresponding to the time may be easily retrieved from the social media using the time information and played back.

FIG. 5 shows that previous hot event information relevant to the currently detected hot event information may be provided by means of a flashback function. For example, when Lee Dae-Ho stands in the batter's box or has hit a home run, Lee Dae-Ho's home run scenes in previous games may be provided to the user. It is possible, if the hot event information is stored in a database, by retrieving the stored hot event information. The video information may be stored in the database along with the hot event information, and may be played back through real-time streaming of the video information corresponding to the hot event information using the time information included therein.

Figure 6:
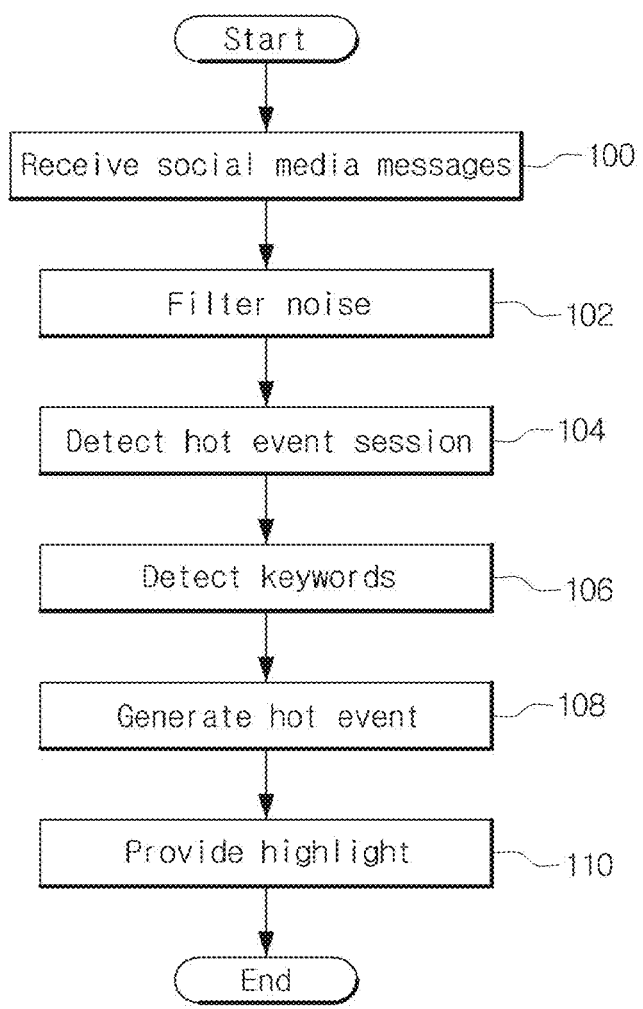
FIG. 6 is a flow chart schematically illustrating a highlight service providing method for a real-time event according to an embodiment of the present disclosure.

FIG. 6 is a flow chart schematically illustrating a highlight service providing method for a real-time event according to an embodiment of the present disclosure.

The highlight providing system 10 for a real-time event according to an embodiment of the present disclosure may be an instant chatting-based video sharing service. As a user watches a real-time event such as a baseball game using the highlight providing system 10 for a real-time event while sharing messages, the highlight providing system 10 for a real-time event receives message streams (100). After noise is filtered from the received message streams by the noise filtering unit 12 (102), the noise-removed message streams are transmitted to the hot event session detection unit 14.

After receiving the message streams, the hot event session detection unit 14 finds the peak positions of messages and detects the hot event session where the hot event occurs, as described above (104). The keyword detection unit 15 detects keywords, i.e. bursty features, by analyzing a binomial distribution of the messages in the hot event session (106). The hot event generating unit 16 generates the hot event using a semantic relation between the detected keywords by (108), and the highlight providing unit 18 provides a highlight of the real-time event using the generated hot event (110).

Thus, the highlight providing system and highlight service providing method for a real-time event according to the present disclosure may provide the highlight of the real-time event along with a description in a natural language as well as video information without additional editing.

Further, a more convenient use environment may be provided since the previous relevant hot events may be provided to the user.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A highlight providing system for a real-time event in a video sharing service, comprising:
a noise filtering unit for:
receiving text message streams of social media from a plurality of users, at least two of the plurality of users concurrently viewing a video provided by the video sharing service;

identifying noise in the text messages streams of social media based on a preset noise condition, the preset noise condition defining types of the noise contained in the text message streams; and removing the identified noise contained in the text message streams and generating noise-removed text message streams of social media;

a hot event session detection unit for detecting a hot event session of the video shared by the plurality of the users using the noise-removed text message streams of social media, wherein a hot event session is identified by a point in the video based on one or more peak positions of the text message streams of social media associated with the point of the video;

a keyword detection unit for detecting keywords related with a hot event within the detected hot event session by analyzing a probability distribution of the noise-removed text message streams associated with the hot event session, the probability distribution of the noise-removed text message streams indicating a probability of the detected keywords related with the hot event within the detected hot event session;

a hot event generating unit for generating the hot event using a semantic relation between the keywords detected by the keyword detection unit, wherein the semantic relation is at least one of an action relation, a sequence relation and a context relation; and a highlight providing unit for:
receiving, from a user of the plurality of the users, a selection of a hot event of the video and timestamp of the selected hot event;
retrieving a portion of the video containing the selected hot event from a hot event database based on the user selection and timestamp of the selected hot event;
providing a highlight of the selected hot event, wherein the highlight of the selected hot event includes a video playback of the selected hot event along with a description in a natural language of the hot event to the user.

2. The highlight providing system for a real-time event according to claim 1, wherein the preset noise condition is that the text messages are noise text messages previously stored in a database or that the frequency of occurrence of the text messages is above a preset threshold value.

3. The highlight providing system for a real-time event according to claim 1, wherein the hot event session detection unit is further for:
selecting one or more sections of the text message streams where the number of text messages occurring is larger than a value determined based on an average number of the text messages that occurred;
detecting a section, among the selected sections, around a point where a gradient of the number of text messages occurring in a given time changes signs, the detected section being identified as the hot event session.

4. The highlight providing system for a real-time event according to claim 3, wherein the section around the point is the section where an absolute value of the gradient of the text messages is larger than a preset threshold value.

5. The highlight providing system for a real-time event according to claim 1, wherein the keyword detection unit is further for detecting the keywords related with the hot event by analyzing a binomial distribution of the messages in the hot event session detected by the hot event session detection unit.

6. The highlight providing system for a real-time event according to claim 1, wherein the highlight providing unit is further for providing an earlier hot event of the video similar to the hot event generated by the hot event generating unit along with a description in a natural language.

7. The highlight providing system for a real-time event according to claim 6, wherein the highlight providing unit is further for providing a video playback of the earlier hot event along with a description in a natural language of the earlier hot event to the user.

8. A highlight service providing computer-implemented method for a real-time event comprising:
receiving text message streams of social media from a plurality of users, at least two of the plurality of users concurrently viewing a video provided by the video sharing service;
identifying noise in the text messages streams of social media based on a preset noise condition, the preset noise condition defining types of the noise contained in the text message streams;
removing the identified noise contained in the text message streams and generating noise-removed text message streams of social media;
detecting a hot event session of the video shared by the plurality of the users using the noise-removed text message streams of social media, wherein a hot event session is identified by a point in the video based on one or more peak positions of the text message streams of social media associated with the point of the video;
detecting keywords related with a hot event within the detected hot event session by analyzing a probability distribution of the text message streams associated with the hot event session, the probability distribution of the noise-removed text message streams indicating a probability of the detected keywords related with the hot event within the detected hot event session;
generating the hot event using a semantic relation between the detected keywords, wherein the semantic relation is at least one of an action relation, a sequence relation and a context relation;
receiving, from a user of the plurality of the users, a selection of a hot event of the video and timestamp of the selected hot event;
retrieving a portion of the video containing the selected hot event from a hot event database based on the user selection and timestamp of the selected hot event; and
providing a highlight of the selected hot event, wherein the highlight of the selected hot event includes a video playback of the selected hot event along with a description in a natural language of the hot event to the user.

9. The highlight service providing method for a real-time event according to claim 8, wherein the preset noise condition is that the text messages are noise text messages previously stored in a database or that the frequency of occurrence of the text messages is above a preset threshold value.

10. The highlight service providing method for a real-time event according to claim 8, wherein said detecting the hot event session comprises:
selecting one or more sections of the text message streams where the number of text messages occurring is larger than a value determined based on an average number of the text messages that occurred; and
detecting a section, among the selected sections, around a point where a gradient of the number of text messages occurring in a given time changes signs, the detected section being identified as the hot event session.

11. The highlight service providing method for a real-time event according to claim 10, wherein the section around the point is the section where an absolute value of the gradient of the text messages is larger than a preset threshold value.

12. The highlight service providing method for a real-time event according to claim 8, wherein said detecting the keywords related with the hot event within the detected hot event session comprises detecting the keywords related with the hot event by analyzing a binomial distribution of the messages in the detected hot event session.

13. The highlight service providing method for a real-time event according to claim 8, further comprising providing an earlier hot event of the video similar to the hot event generated by the hot event generating unit along with a description in a natural language.

14. The highlight service providing method for a real-time event according to claim 13, further comprising providing a video playback of the earlier hot event along with a description in a natural language of the earlier hot event to the user.

* * * * *